(12) United States Patent
Renton

(10) Patent No.: US 6,385,138 B1
(45) Date of Patent: May 7, 2002

(54) TIME-KEEPER

(76) Inventor: Julian Elwyn Renton, Frankleigh Farm, Bath Road, Bradford-on-Avon, Wiltshire BA15 2PF (GB)

( * ) Notice: Subject to any disclaimer, the term of this patent is extended or adjusted under 35 U.S.C. 154(b) by 657 days.

(21) Appl. No.: 08/763,955

(22) Filed: Dec. 11, 1996

(51) Int. Cl.[7] ............................................. G04B 19/06
(52) U.S. Cl. ........................................................ 368/229
(58) Field of Search ........................... 368/77, 229, 80, 368/223

(56) References Cited

U.S. PATENT DOCUMENTS

| | | | | |
|---|---|---|---|---|
| 391,271 A | * | 10/1888 | Phelps | 368/229 |
| 822,776 A | * | 6/1906 | Schweizer-Schatzmann | 368/229 |
| 2,361,563 A | * | 10/1944 | Pellaton | 368/80 |
| 4,407,586 A | * | 10/1983 | Musy | 368/77 |
| 5,339,293 A | * | 8/1994 | Kamiyama et al. | 368/80 |

FOREIGN PATENT DOCUMENTS

| | | | | |
|---|---|---|---|---|
| CH | 264667 | * | 10/1949 | 368/229 |
| CH | 339107 | * | 7/1959 | 368/229 |
| FR | 2666664 | * | 3/1992 | 368/229 |
| GB | 550361 | * | 1/1943 | 368/229 |

* cited by examiner

Primary Examiner—Bernard Roskoski
(74) Attorney, Agent, or Firm—Wenderoth, Lind & Ponack, L.L.P.

(57) ABSTRACT

A time-keeper has two discs 5 and 6 at least partly visible from the front of the time-keeper. The discs are urged to rotate by the time-keeper drive mechanism in casing 10 such that each disc rotates in the same direction and angular velocity as time-keeper hand 2. Time-keeper hand 2 is a conventional clock and/or watch hand such as hour hand, minute hand or second hand.

11 Claims, 5 Drawing Sheets

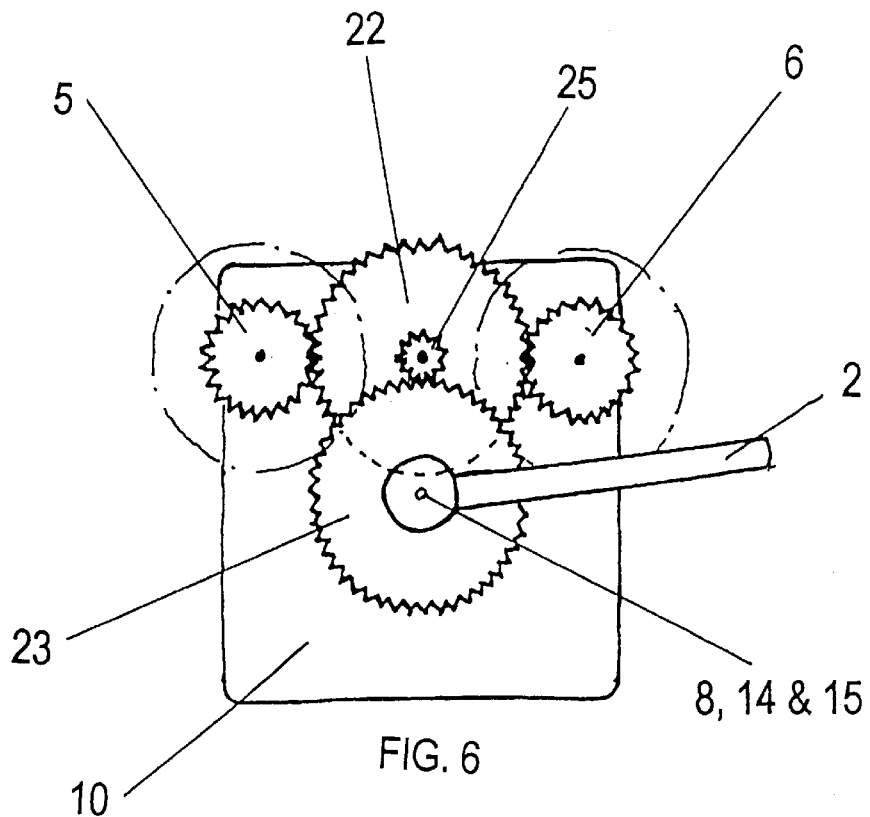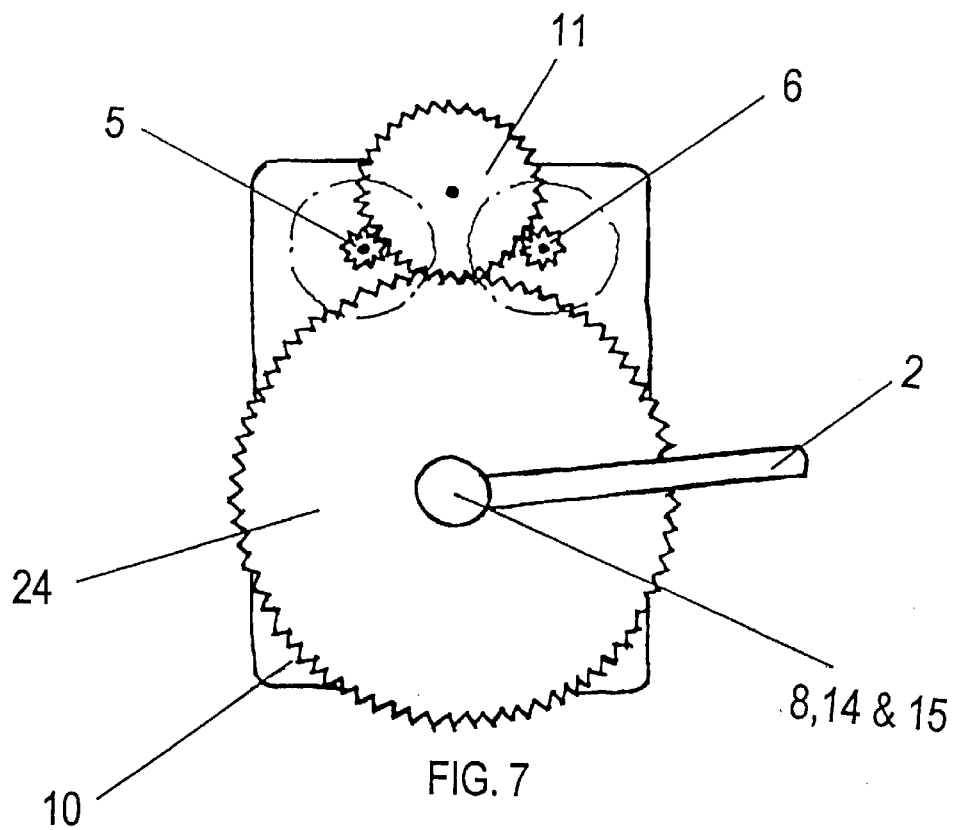

TIME-KEEPER

BACKGROUND OF THE INVENTION

This invention relates to a time-keeper particularly to a time-keeper such as a clock or watch for children to encourage children to become more aware of the movement of the clock or watch hands such as the hour, minute and second hands as time passes.

On conventional time-keepers, the hands are the only visible features which change position with time. However, many children when learning the time do not notice the change in the position of the hands, particularly the minute and hour hands. It would be valuable to provide features in addition to the time-keeper hands which change position as time passes and which relate to the time-keeper hands such that children become more aware of the change in position of the time-keeper hands with time,

SUMMARY OF THE INVENTION

According to the present invention, there is provided two or more discs positioned apart whereby one surface of each disc is at least partly visible from the front of the time-keeper and in the same or parallel plane as the front of the time-keeper. Each disc is urged to rotate by the time-keeper drive mechanism typically but not necessarily about the radial center of each disc such that each disc rotates in the same direction and at the same angular velocity as the other disc or discs and also in the same direction and angular velocity as a conventional time-keeper hand such as the hour hand, minute hand or the second hand. The visible surface of each disc provides a valuable platform onto which graphic representations could be placed to indicate the change in position of each disc as time passes. The visible surface of the each disc can be flat or formed in three dimensions such as spherical, parabolic, conical or any other regular or irregular form. The periphery of the visible surface of each disc can be any regular or irregular shape and size.

BRIEF DESCRIPTION OF THE DRAWINGS

Some embodiments of the invention will now be described by way of example with reference to the accompanying drawings in which:

FIG. 6 shows a front elevation of an arrangement for rotating the two discs through gears urged by the hour hand bearing shaft such that the discs rotate at the same angular velocity and direction as the minute hand bearing shaft.

FIG. 7 shows a front elevation of an alternative arrangement for rotating the two discs through gears urged by the hour hand-bearing shaft such that the discs rotate at the same angular velocity and direction as the minute hand-bearing shaft.

DETAILED DESCRIPTION OF THE PREFERRED EMBODIMENTS

Figure 1:
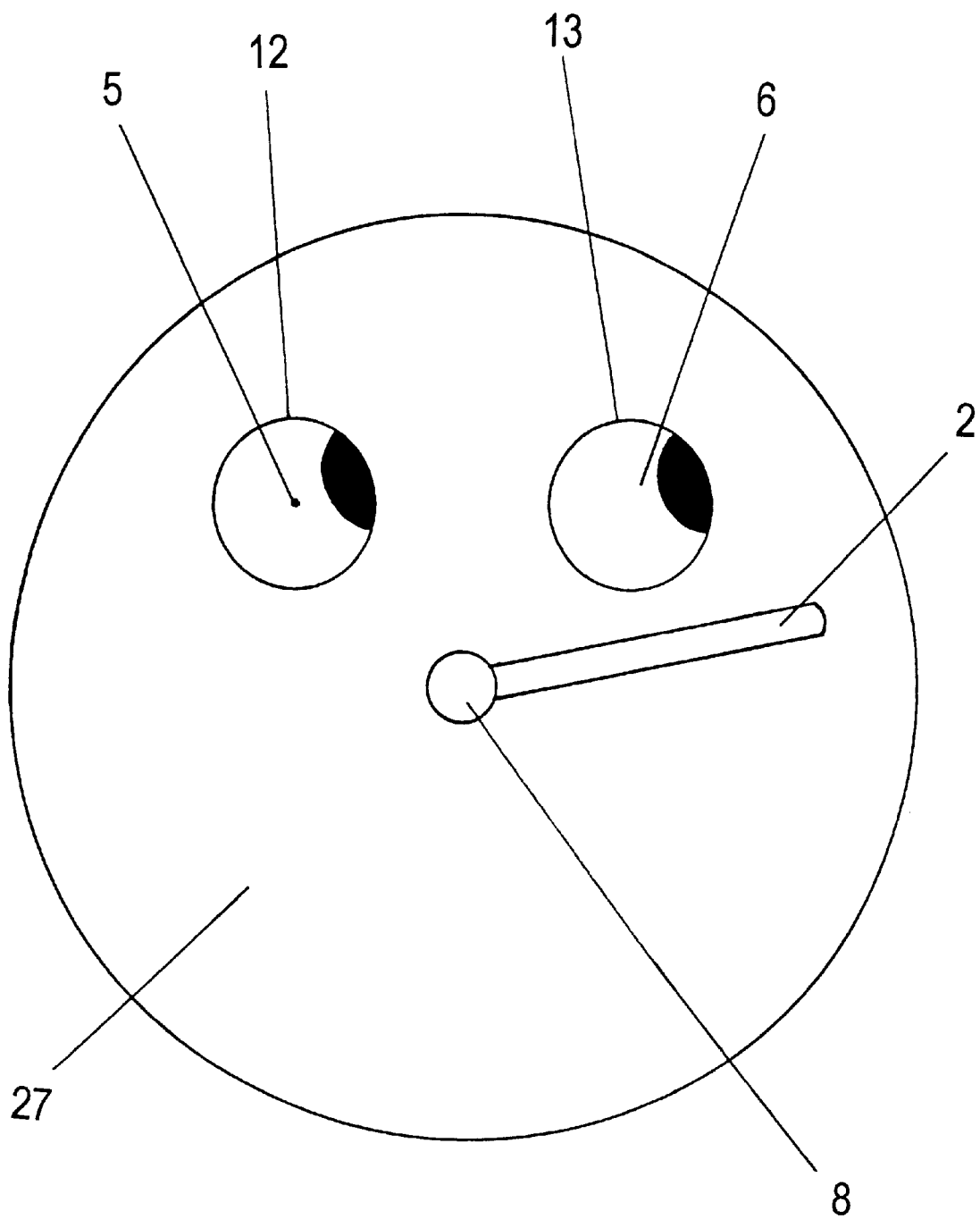
FIG. 1 shows a front elevation of a time-keeper embodying the invention.

As shown in FIGS. 1 to 7, a time-keeper has a substantially conventional mechanical drive mechanism, powered electrically or by clockwork. Thus there is a housing 10 from which two or three concentric hand-bearing shafts 8, 14 and 15 extend forward. The outer hand bearing shaft 8 carries the conventional hour hand, the intermediate hand bearing shaft 14 carries the conventional minute hand and the inner hand bearing shaft 15 carries the conventional second hand. The hand-bearing shafts are urged to rotate by the time-keeper drive mechanism shown in housing 10. Time-keeper hand 2 can be any conventional time-keeper hand such as the hour hand, minute hand or second hand or any other conventional time-keeper hand.

Most embodiments of the invention can be applied without hand-bearing shaft 15 and some embodiments of the invention can be applied without hand-bearing shaft 14, Geared discs 5 and 6 which are at least partially visible from the front of the time-keeper have the same measured geared diameter and can each rotate. The periphery of their surfaces visible from the front of the time-keeper can extend beyond the outside diameter of the geared part of the discs.

Figure 2:
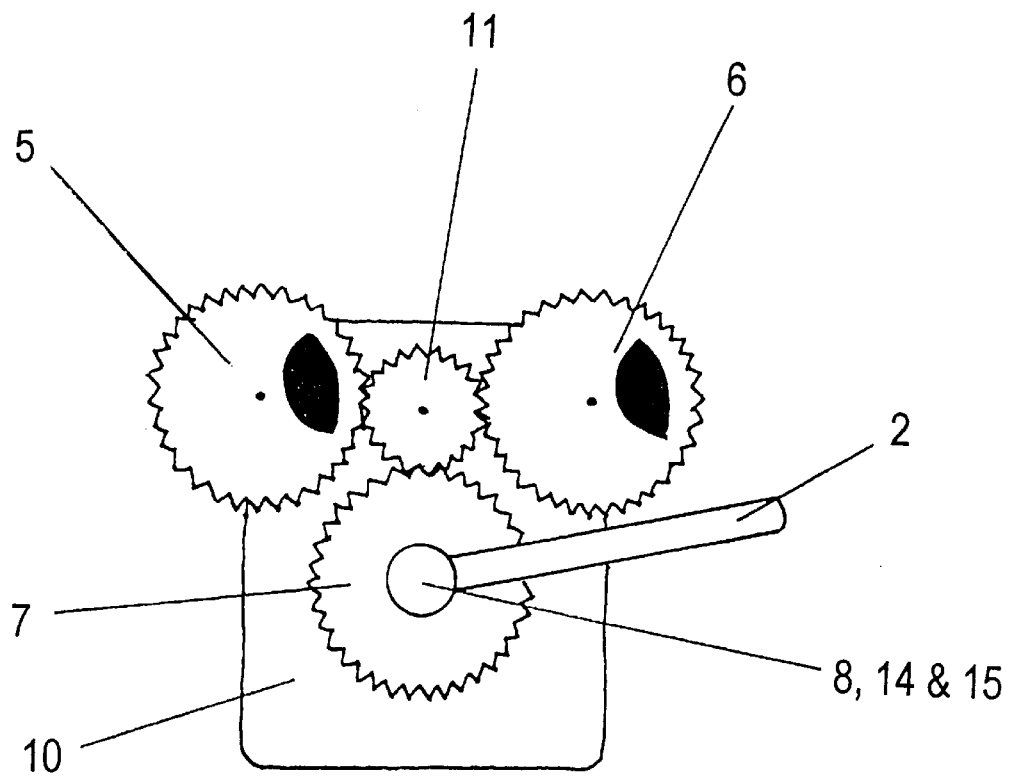
FIG. 2 shows a front elevation of an arrangement for rotating the two discs through gears urged by movement typically of the hour hand bearing shaft.

In FIG. 2, geared disc 7 has the same diameter as the gear forms on both geared discs 5 and 6 and is fixed to the outer concentric hour hand-bearing shaft 8 carrying time-keeper hand 2. Geared disc 11 is engaged with geared discs 5, 6, and 7 such that when hand-bearing shaft 8 is urged to rotate by the time-keeper drive mechanism, then geared discs 5, 6 and 7 are constrained to rotate in the same direction and at the same angular velocity such that geared discs 5 and 6 rotate in the same direction and at the same angular velocity as time-keeper hand 2.

Figure 3:
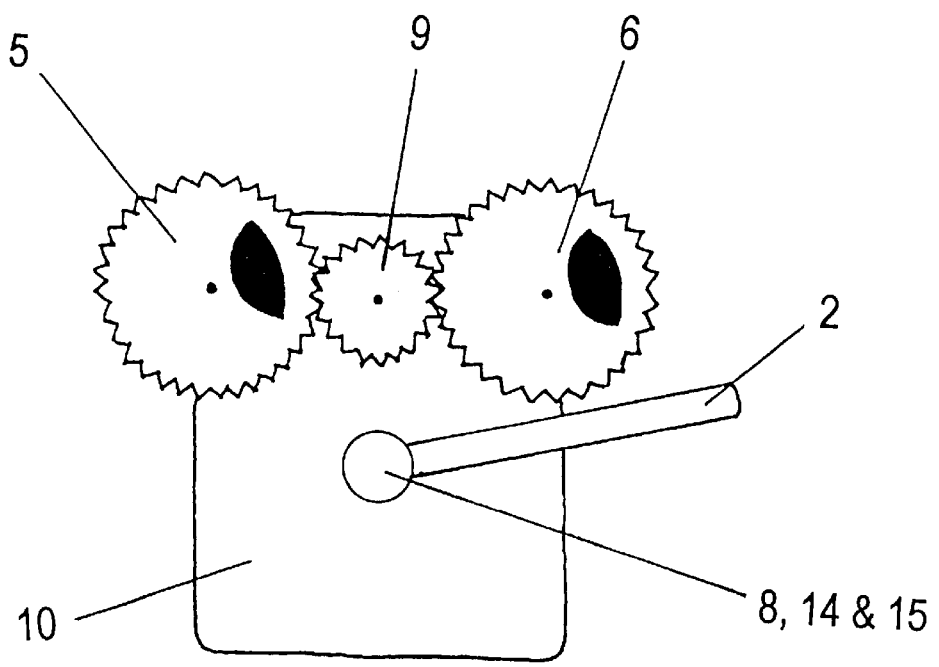
FIG. 3 shows a front elevation of an arrangement for rotating the two discs through one or more gears not directly urged by movement of one or more hand-bearing shafts.

In FIG. 3, geared disc 9 is engaged with a part of the time-keeper drive mechanism in casing 10 which is not necessarily engaged with hand-bearing shafts 8, 14 or 15 such that geared discs 5 and 6 rotate in the same direction and at the same velocity as time-keeper hand 2 whereby time-keeper hand 2 can be any conventional time-keeper hand.

Figure 4:
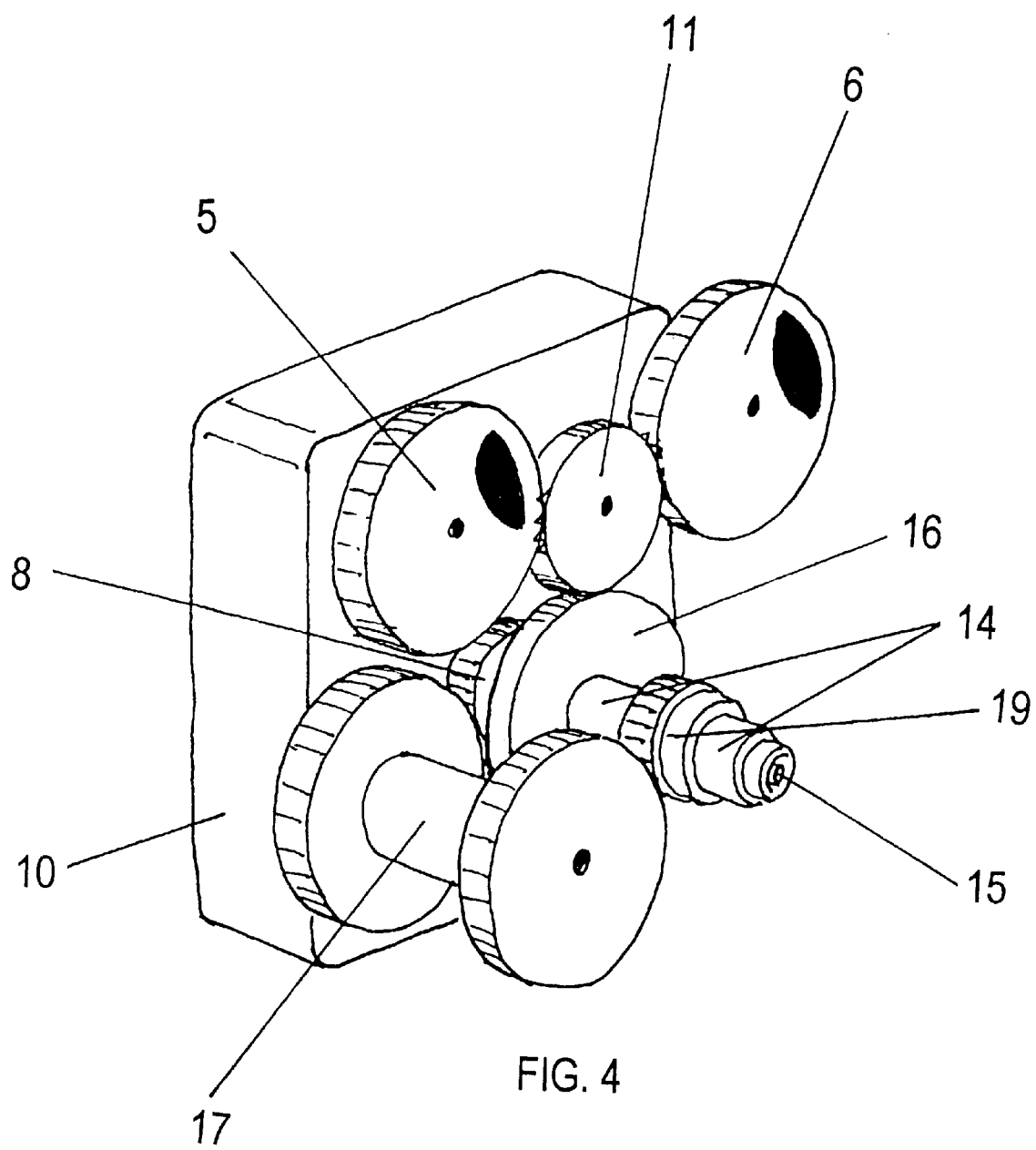
FIG. 4 shows in perspective an arrangement for rotating the two discs through gears urged by the minute hand-bearing shaft.

In FIG. 4, minute hand-bearing shaft 14 carries time-keeper hand 2. Hour hand-bearing shaft 8 is shortened with gear teeth applied to its circumference such that it engages with gear 17. Gear 17 also engages with gear 19 such that hand-bearing shaft 8 and gear 19 rotate in the same direction and at the same angular velocity. In particular, gear 19 is configured such that it fits concentrically onto hand-bearing shaft 14 and is free to move radially about the outer surface of hand-bearing shaft 14. Gear 19 is also typically configured to carry the time-keeper hour hand. Gear 16 is fixed to hand-bearing shaft 14 and is the same diameter as the gear forms on geared discs 5 and 6. Gear 11 engages with gear 16 and geared discs 5 and 6 such that geared discs 5 and 6 rotate in the same direction and angular velocity as hand shaft 14 and time-keeper hand 2.

Figure 5:
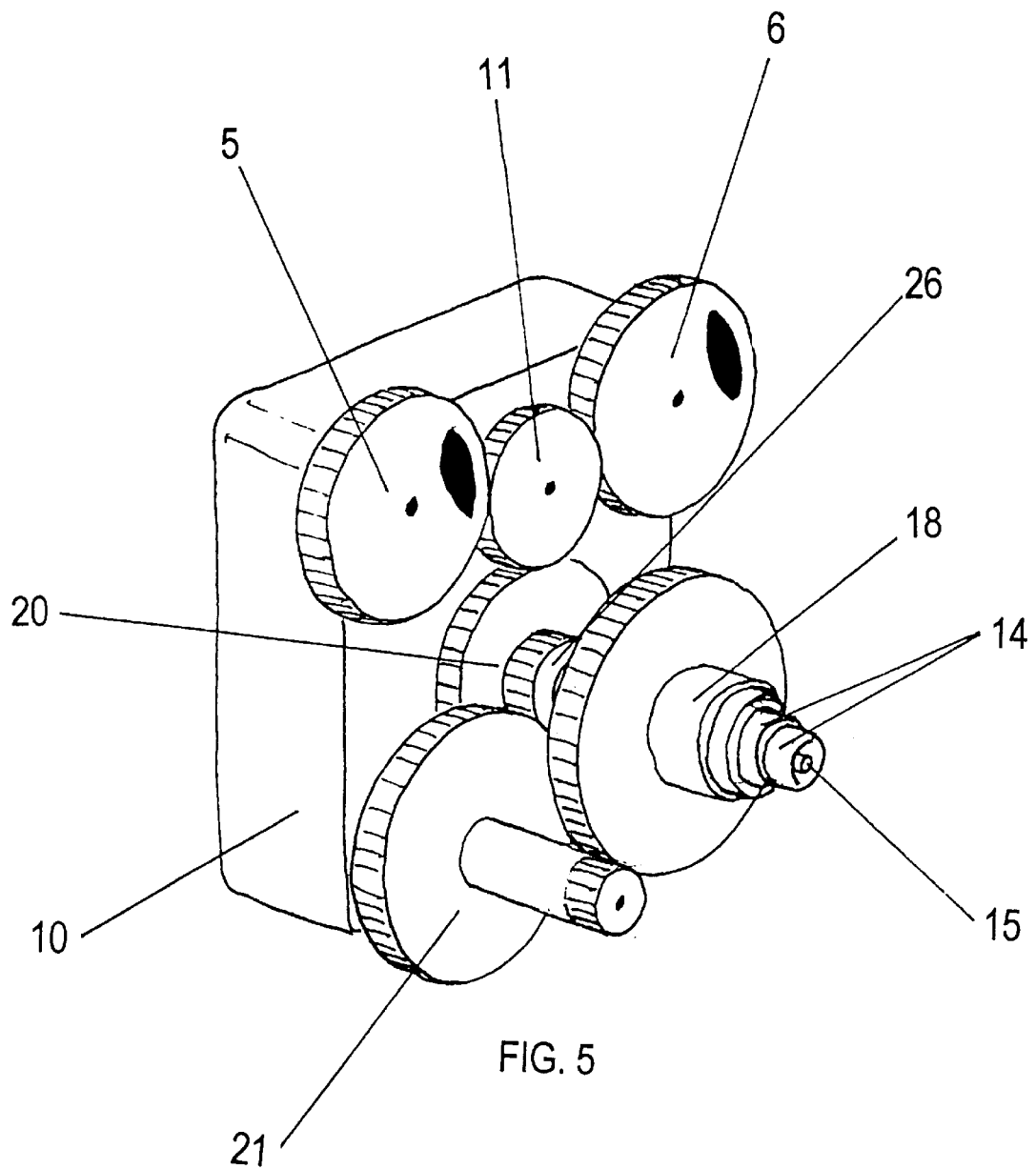
FIG. 5 shows in perspective an alternative arrangement for rotating the two discs through gears urged by movement of the minute hand-bearing shaft.

In FIG. 5, minute hand-bearing shaft 14 carries time-keeper hand 2. Hand-bearing shaft 8 has been removed such that minute hand bearing shaft 14 becomes the outer hand-bearing shaft. Gear 20 and gear 26 are fixed to hand-bearing shaft 14. Gear 18 is configured such that it fits concentrically onto hand-bearing shaft 14 and is free to move radially about the outer surface of hand-bearing shaft 14. Gear 18 is also configured to carry the time-keeper hour hand. Gear 21 is engaged with gear 26 and gear 18 such that when gear 26 has moved through exactly twelve complete revolutions gear 18 has been urged to move through one compete revolution.

Gear 20 has the same diameter as the gear forms on geared discs 5 and 6. Gear 11 engages gear 20 and geared discs 5 and 6 such that geared discs 5 and 6 rotate in the same direction and angular velocity as hand shaft 14 and time-keeper hand 2.

In FIG. 6, time-keeper hand 2 is carried by minute hand bearing shaft 14. Gear 23 is fixed to hour hand bearing shaft 8. Gear 25 is fixed to or is an integral pan of gear 22 such that both gears can rotate together on the same axis and at the same angular velocity. Gear 23 engages with gear 25 and gear 22 engages with geared discs 5 and 6 such that when gear 23 has moved through exactly one complete revolution then geared discs 5 and 6 have both moved through exactly 12 revolutions such that geared discs 5 and 6 rotate in the same direction and angular velocity as time-keeper hand 2

In FIG. 7, time-keeper hand 2 is carried by minute hand bearing shaft 14. Gear 24 is fixed to the hour hand bearing shaft 8. Gear 24 engages with gear 11 which engages with geared discs 5 and 6 such that when gear 24 moves through exactly one complete revolution then geared discs 5 and 6 have moved through exactly 12 complete revolutions such that geared discs 5 and 6 rotate in the same direction and angular velocity as hand shaft 14 and time-keeper hand 2.

In FIG. 1, discs 5 and 6 are shown at least partly visible through two circular openings 12 and 13 concentric with discs 5 and 6 respectively. Discs 5 and 6 could also be completely visible with the visible surfaces being in the plane of time-keeper face 27 or in a parallel plane in front of time-keeper face 27 Time-keeper hand 2 is also visible in front of time-keeper face 27 such that when time-keeper hand 2 is urged to rotate by the time-keeper drive mechanism in casing 10, discs 5 and 6 rotate in the same direction and angular velocity as time-keeper hand 2.

What is claimed is:

1. A time keeper such as a clock or watch, said time keeper having a front and comprising:
   a time keeper mechanism;
   a second hand physically connected to said time keeper mechanism such that said time keeper mechanism can urge said second hand to rotate, and said second hand having an axis of rotation;
   two or more discs having respective axes that are substantially parallel to said axis of rotation of said second hand, said two or more discs being positioned apart from each other so as to be at least partly visible from the front of said time keeper, and said two or more discs being located in a plane selected from the group consisting of the same plane as the front of said time keeper and a plane that is substantially parallel to the front of said time keeper; and
   means for urging said two or more discs to rotate about their respective said axes such that said two or more discs rotate at the same angular velocity and direction as each other and at the same angular velocity and direction as said second hand.

2. The time keeper of claim 1, wherein said two or more discs are connected to said time keeper mechanism for rotation thereby.

3. The time keeper of claim 1, wherein said two or more discs are connected for rotation with an independent means for urging said two or more discs to rotate, said independent means being independent from said time keeper mechanism.

4. The time keeper of claim 1, wherein said two or more discs comprise at least one surface that is a three dimensionally shaped surface having a form selected from the group consisting of spherical, parabolic, conical, regular and irregular forms.

5. The time keeper of claim 1, wherein at least one of said two or more discs has a periphery that is not round.

6. The time keeper of claim 1, wherein said two or more discs vary in at least one characteristic selected from the group consisting of having a different size, having a different three dimensional surface form and having a periphery that is not round.

7. The time keeper of claim 1, wherein at least one of said two or more discs have surface indicia thereon that remain visible through 360 degree rotation thereof.

8. The time keeper of claim,1, wherein said means for urging said discs comprises a gear mechanism rotatably interconnecting said two or more discs with said time keeper mechanism.

9. A time keeper comprising:
   a time keeper mechanism having a front side;
   a second hand physically connected to said time keeper mechanism so as to be mounted on said front side thereof and such that said time keeper mechanism can urge said second hand to rotate, and said second hand having an axis of rotation;
   at least two discs having respective axes that are substantially parallel to said axis of rotation of said second hand, said two or more discs each being positioned so as to be at least partly visible from said front side of said time keeper; and
   means interconnecting said at least two discs with said time keeper mechanism for rotating said at least two discs about their respective said axes such that said two or more discs rotate at the same angular velocity and direction as each other and at the same angular velocity and direction as said second hand.

10. The time keeper of claim 9, wherein said at least two discs each comprises indicia thereon that remain visible through 360 degrees of rotation of said at least two discs.

11. The time keeper of claim 10, wherein said indicia are located at an angular position on said at least two discs that is the same as the angular position of said second hand, such that said indicia and said time-keeping hand are directed in the same angular direction.

* * * * *